United States Patent [19]

Kah, Jr.

[11] Patent Number: 4,469,304
[45] Date of Patent: Sep. 4, 1984

[54] PULSE ACTUATED SOLENOID VALVE

[76] Inventor: Carl L. C. Kah, Jr., 778 Lakeside Dr., North Palm Beach, Fla. 33408

[21] Appl. No.: 140,538

[22] Filed: Apr. 15, 1980

[51] Int. Cl.³ ............................................. F16K 31/08
[52] U.S. Cl. ...................................... 251/65; 251/129; 251/141
[58] Field of Search ........................... 251/129, 141, 65

[56] References Cited

U.S. PATENT DOCUMENTS

| 3,203,447 | 8/1965 | Bremner et al. | 251/65 X |
| 3,368,788 | 2/1968 | Padula | 251/141 X |
| 3,379,214 | 4/1968 | Weinberg | 251/141 X |
| 3,955,795 | 5/1976 | Neely | 251/129 |
| 4,056,255 | 11/1977 | Lace | 251/129 |

FOREIGN PATENT DOCUMENTS 2302471 9/1976 France ................................ 251/141

Primary Examiner—Arnold Rosenthal
Attorney, Agent, or Firm—Jack N. McCarthy

[57] ABSTRACT

A pulse actuated solenoid valve having a valve body and cover with a valve plunger formed as a permanent magnet is biased in a closed position to prevent flow through. Said solenoid valve has an electromagnetic coil and core placed adjacent the valve plunger to place the plunger in an open position, permitting flow through said solenoid valve and for releasing it to its closed position. The electromagnetic coil has one end connected to the pole of a single-pole, double-throw switch, while the other end of the electromagnetic coil is connected to one side of a capacitor. One terminal of the double-throw switch is connected to the other side of the capacitor, while the other terminal is connected to one terminal of a power source; the other side of the capacitor is also connected to the other terminal of the power source. Means are provided to time the movement of the double-throw switch from one position to the other. Both A.C. and D.C. power sources, and control means, are provided for charging a capacitor through an electromagnetic coil in one direction and having the same charge be discharged through the electromagnetic coil in the opposite direction when desired.

The mating faces of the valve plunger and core are provided with a groove or vent to prevent hydraulic locking therebetween.

5 Claims, 4 Drawing Figures

U.S. Patent  Sep. 4, 1984  4,469,304
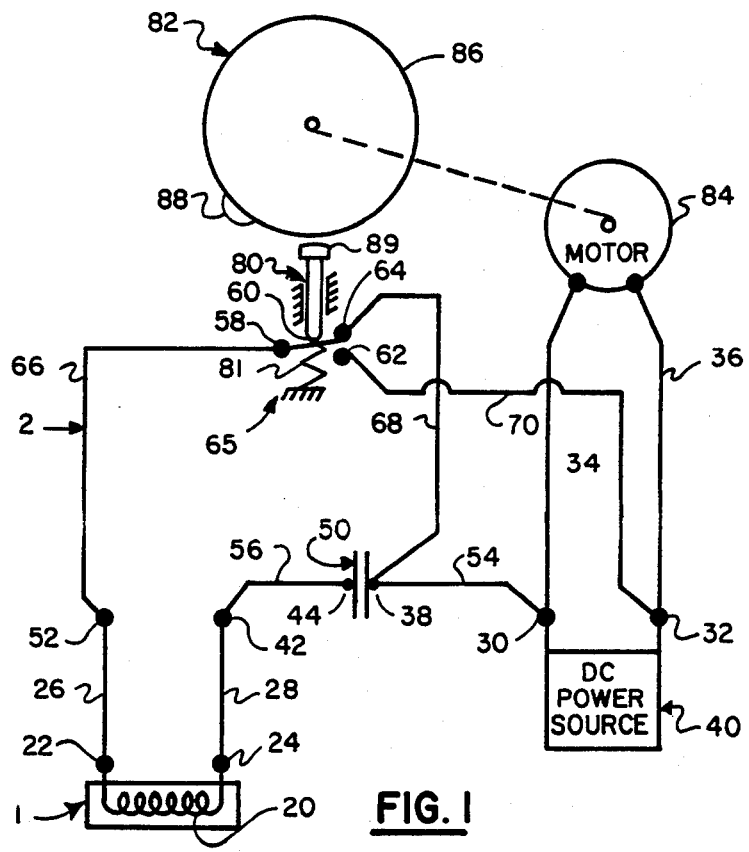
FIG. 1
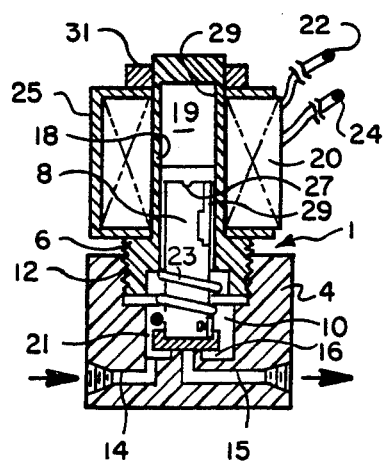
FIG. 2
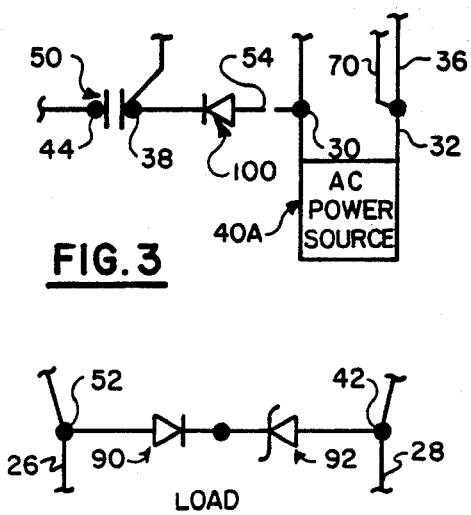
FIG. 3
FIG. 4

PULSE ACTUATED SOLENOID VALVE

BACKGROUND OF THE INVENTION

This invention relates to pulse actuated solenoid valves and their control means, including actuating circuits and actuators. While solenoid valves have been used in the past involving permanent magnets and similar circuitry, see U.S. Pat. No. 3,203,447; U.S. Pat. No. 3,379,214; U.S. Pat. No. 3,757,263; and U.S. Pat. No. 4,056,255, the specific inventive combination disclosed herein cannot be found and represents a very economical technology configuration for manufacture.

SUMMARY OF THE INVENTION

It is an object of this invention to provide an actuating circuit having a power source for providing an electrical pulse through an electromagnetic coil in one direction and then the other when desired, said electromagnetic coil being positioned in a solenoid valve controlling movement of a valve plunger formed as a permanent magnet, said valve plunger being spring biased to a closed position. It is another object of this invention to provide a circuit having an electromagnetic coil in series with a capacitor which can provide an electrical pulse for passing through said coil in one direction and charging the capacitor and having an electrical impulse pass through said coil in the opposite direction by discharging its capacitor, thereby reducing the amount of power needed for operation. This very low power consumption allows units to be easily operated on batteries or photo cells.

A further object of the invention is to provide means for limiting the closing pulse to that magnetic intensity necessary to move the permanently magnetized valve plunger to its closed position to reduce the possibility of demagnetizing the valve plunger.

Another object of this invention is to provide a vent groove across the top surface of the valve plunger which engages the bottom surface of a core fixedly mounted within the top portion of the electromagnetic coil. This vent groove prevents the valve plunger from being hydraulically locked, or latched, to the core so that the valve plunger can move rapidly away from the core on a short pulse. It is also possible to place a vent groove in the bottom surface of the core.

BRIEF DESCRIPTION OF THE DRAWINGS

FIG. 1 is a schematic view of an actuating circuit for providing an electrical pulse through an electromagnetic coil in one direction, and then the other, when desired; electromechanical means are also shown for timing said pulses;

FIG. 2 is a representative view of a solenoid valve having a plunger formed as a permanent magnet;

FIG. 3 is a view of a portion of FIG. 1 showing a modification wherein an A.C. power source is used;

FIG. 4 is a view of a portion of FIG. 1 showing a modification wherein the voltage across the load connectors is controlled at a desired value to prevent too great a magnetic intensity for repelling the valve plunger of the solenoid valve.

DESCRIPTION OF THE PREFERRED EMBODIMENT

In FIG. 1, the actuating circuit 2 has a pair of input connectors 30, 32 and a pair of load connectors 42, 52. Input connector 30 is connected to one terminal 38 on one side of a capacitor 50 by a line 54, while another terminal 44 on the other side of the capacitor 50 is connected to the load connector 42 by a line 56. A single-pole, double-throw switch 65 has a terminal 58 with a movable connector arm 60. The free end of the arm 60 is located between two terminals 62 and 64 with a spring 81 of the switch 65 biasing the free end of arm 60 against the terminal 64.

The terminal 58 is connected to the load connector 52 by a line 66; the terminal 64 is connected to terminal 38 of the capacitor 50 by a line 68; and the terminal 62 is connected to input connector 32 by a line 70.

An electromagnetic coil 20 has a terminal 22 located at one end and a terminal 24 located at the other end. As shown in FIG. 1, this electromagnetic coil is the load and terminal 22 is connected to load connector 52 by a line 26 and terminal 24 is connected to load connector 42 by a line 28. A D.C. power source 40 is connected across the input connectors 30 and 32.

As the movable connector arm 60 is moved by an outside force, against the force of spring 81, to contact terminal 62, the D.C. power source is connected so that current flows from input connector 30 into capacitor 50, and out of terminal 44, to load connector 42 and thereby through the electromagnetic coil 20 of device 1, to be hereinafter described, from terminal 24 to terminal 22, to the other load connector 52; the current then flows through switch 65 from terminal 58 to terminal 62 thereof and on to terminal 32 of the D.C. power source; this current flow charges the capacitor 50. When the capacitor 50 is charged to its capacity, the current flow from the D.C. power source ceases. The capacitor is sized so that this charging current flow is just the desired impulse through the electromagnetic coil 20. When the outside force is removed and spring 81 is allowed to return the movable connector arm 60 against terminal 64, the charge in the capacitor 50 will discharge and cause an impulse of current flow from terminal 38 through the switch 65 from terminal 64 to terminal 58 to load connector 52; the impulse of current then flows through the electromagnetic coil 20, from terminal 22 to terminal 24, to load connector 42 and then to terminal 44 of the capacitor 50, neutralizing (deenergizing) it, and placing it in a position to be recharged by the next movement of the movable connector arm 60 of the switch 65 into contact with terminal 62 as described above.

In FIg. 2, the device 1 is shown as a solenoid valve having four main parts: (1) a valve body 4; (2) a valve cover 6; (3) a valve plunger 8; and (4) a solenoid (electromagnetic coil) 20. The valve body 4 is recessed to form a chamber 10 with a recess in the bottom of valve cover 6 which is threadably secured to the valve body 4 at 12. An O-ring seal means is provided between the valve body 4 and valve cover 6 to prevent leakage. A passage 14 extends from the exterior of said valve body 4 into the chamber 10 to direct a fluid thereinto. A valve seat 16 is formed by a raised portion at the bottom of chamber 10 which is in line with a centerline of a cylinder 18 which opens into chamber 10 and extends upwardly from valve cover 6 and forms a part thereof. A passage 15 extends through said valve seat to connect the interior of the chamber 10 with the exterior of the valve body 4 for directing a fluid therefrom. A core 19, formed of a metal which can conduct magnetic flux, is fixed in the closed top of said cylinder 18, such as by bonding or other means, and the movable plunger 8 is positioned between the bottom of said core 19 and the valve seat 16 of valve body 4. Valve plunger 8 is permitted a predetermined axial movement between the bottom of said core 19 and the top of said valve seat 16.

The valve plunger 8 is formed as a cylinder with its top end having a groove 27 passing from one side to the other for a purpose to be hereinafter described, while the bottom has a resilient cap 21 fixed thereto, such as by bonding, to permit a leakproof engagement with the valve seat 16. A spring 23 is located around said valve plunger 8 with its top edge abutting against an annular surface on valve cover 6 and its bottom edge abutting the exposed edge of the resilient cap 21. This spring 23 biases the valve plunger 8 in a direction towards the valve seat 16.

The valve plunger 8 is formed of a permanent magnet material and has its movement controlled by the electromagnetic coil 20 which is placed on and fixed to the exterior of the cylinder 18. A magnetic flux path can be provided around the outside of electromagnetic coil 20 by a metal member 25 which is also fixed to the valve cover 6 to aid in holding the electromagnetic coil 20 in place. The metal member 25 is shown having aligned openings 29 placed over cylinder 18. A nut, or holding ring, 31 is fixed to the top of cylinder 18. This member 31 can be threaded or pressed on. One form of construction could have the plastic of the valve cover 6 formed around the electromagnetic coil 26 and metal member 25. The metal member 25 provides a magnetic flux path from one end of the electromagnetic coil 20 to the other, thereby improving the efficiency of the electromagnetic coil 20. The member 25 should be a metal with good electromagnetic permeability and low retentivity, i.e., soft iron. The width of the metal member 25 is that required to provide the magnetic flux path at flux densities that are commensurate with the permeability of the magnetic material that is used.

It can be seen from FIG. 2 of the solenoid valve 1 that the permanent magnetic force of the valve plunger 8 at the distance between the valve plunger 8 and core 19 is not great enough by itself to overcome the force of the spring 23. With the solenoid valve 1 of FIG. 2 having its terminals 22 and 24 connected to the lines 26 and 28 of the actuating circuit 2 as shown in FIG. 1, movement of the movable connector arm 60 to contact terminal 62 will direct an impulse of current flow in a direction through the electromagnetic coil 20 of solenoid valve 1 to momentarily attract the plunger 8 upwardly whereby its upper surface is placed against the lower surface of core 19 and fluid flow is permitted in valve body 4 between passage 14 and passage 15. In this position, the permanent magnetic force of the valve plunger 8 is great enough by itself to overcome the force of the spring 23 and remain in this position when the impulse has ended. It is noted that in this position, the spring 23 has been compressed in a manner greater than shown in FIG. 2.

Movement of the movable connector arm 60 against terminal 64 by spring 81, when the outside force is removed, permits the charge on the capacitor 50 to pass from its terminal 38 through switch 65 and through the electromagnetic coil 20 in a direction from terminal 22 to terminal 24 as an impulse of current flow, and it passes to the other terminal 44 of the capacitor 50, thereby discharging the capacitor 50. It is noted that this second impulse did not place any drain on the D.C. power source 40. The second impulse of current flow, from the capacitor 50 alone, directed the impulse of current flow in a direction through the electromagnetic coil 20 of solenoid valve 1 to momentarily repel the plunger 8 downwardly whereby its resilient cap 21 is placed against the valve seat 16 where it is held in this position by the force of the spring 23. In this position, fluid flow is prevented between passage 14 and passage 15. As mentioned hereinbefore, in this position the permanent magnetic force of the valve plunger 8 is not great enough by itself to overcome the force of the spring 23, thereby leaving the valve in the position shown in FIG. 2.

It has been found experimentally that placing a vent groove 27 across the top of the valve plunger 8 prevents it from being hydraulically locked to the core 19. Hydraulic locking between the mating surfaces of valve plunger 8 and core 19 prevents the valve plunger 8 from moving rapidly away from the core 19. If the plunger 8 does not release rapidly, it may not release at all, since the force required to cancel the force of the permanent magnetized valve plunger 8 only remains for the duration of the impulse of current flow from the capacitor 50 alone. It is thus important to vent the top of the valve plunger 8, or the mating surface of the core 19, to prevent hydraulic locking.

This circuit 2 can also be used with an A.C. power source 40A and to change the actuating circuit 2 shown in FIG. 1 to accommodate an A.C. power source 40A, it is necessary that a diode 100 be placed in series with the capacitor 50 in line 54 between input connector 30 and terminal 38, as shown in the fragmentary view of FIG. 3, whereby current flow is only permitted to flow from input connector 30. This provides a pulsing direct current as is well known in the art.

The actuating circuit 2 is connected to a power source of sufficient voltage to generate the required electromagnetic force when applied across the electromagnetic coil 20 and capacitor 50 to move the valve plunger 8 against the spring 23 to place its upper surface against the core 19. The capacitor 50 is of such sufficient size so that the current flow produced in discharging the capacitor provides the required electromagnetic force when applied across the electromagnetic coil 20, in the opposite direction, to cancel the permanent magnetic force sufficiently to allow the spring 23 to force the plunger 8 to its closed position.

To prevent the cancelling magnetic flux caused by the closing pulse from the capacitor 50 from being excessive and thereby tending to demagnetize the permanent magnetism of the valve plunger 8, an additional circuit may be placed across the load connectors 52 and 42 to reduce the discharge voltage of the capacitor 50 to that desired to just overcome the magnetic holding force of the permanent magnetic plunger 8 without tending to demagnetize it. This allows using less expensive permanent magnetic material. This circuit includes a blocking diode 90 and a Zener diode 92. The Zener diode 92 breaks down at voltages above a selected level when a positive (current flow is positive to negative for this discussion) voltage is imposed on the base (bar side schematically). Thus when the voltage level at point 52 is more positive than the voltage desired across the load connectors 52, 42, the Zener diode will conduct until the proper voltage is obtained, and will then shut off. This dissipates the discharge voltage of the capacitor 50 above that which is desired to merely overcome the permanent magnetic force of the valve plunger 8 and allow the valve plunger 8 to be moved to its closed position without any demagnetizing effects.

If only a resistor were used to limit the current between the load connectors 52 and 42 in one direction, there may not be sufficient voltage available after long battery usage when a D.C. power source is used. The blocking diode 90 is needed to prevent a short circuit from load connector 42 to load connector 52 when the switch 65 is placed in its position connecting terminals 58 and 62.

For actuating the switch 65, a plunger 80 is mounted relative to the movable connector arm 60 to move it against spring 81 when desired. While this plunger can be moved manually, it can also be moved automatically by a timing device 82 shown schematically having a standard self-contained synchronous clock motor 84 and a time dial 86 which is rotated one revolution every twenty-four hours.

Cam means 88 can be located around the periphery of the time dial 86 so that it will contact the head 89 of the plunger 80. The cam means 88 can include pin means for locating one or more of the cam means around the periphery of the time dial 86 to provide for a positive downward movement of plunger 80 at desired times and for desired lengths. A timing device to provide such an action is shown in U.S. Pat. No. 4,029,918.

It is also to be understood that an electronic switching circuit can be used for switch 65, which is well within the realm of one skilled in the art. Further, a second independently operated switch with a second electromagnetic coil can be located in parallel with a first switch and electromagnetic coil and in series with the single capacitor for dual operation.

If added to FIG. 1, a second electromagnetic coil, such as 20, would have one terminal connected to load connector 42 with the other terminal connected to the terminal having the movable connector arm of a second single-pole, double-throw switch. One terminal of the second switch which has the movable connector arm biased against it would be connected to terminal 38 of capacitor 50. The other terminal which can be contacted by the movable connector arm would be connected to the input connector 32 of the power source. Means interconnect both single-pole, double-throw switches so that when one switch is being used, the movable connector arm of the other switch is placed in a neutral position between its terminals 62 and 64.

In circuitry built and tested, an actuating circuit 2 included a standard single-pole, double-throw switch 65 with the movable contact 60 spring-biased to a closed position in one direction, a D.C. power source 40 having 12 volts, a capacitor 50 of 3300 micro-farads, and a commercially available solenoid valve 1 having an electromagnetic coil 20 with a resistance of approximately 20 ohms. The plunger 8 was formed as a permanent magnet, with a high degree of magnetization and good retentivity.

I claim:

1. A solenoid valve having a housing, said housing having a chamber located therein, a first passage having a first opening in said chamber, said housing having a cylindrical opening extending from said chamber having a closed end, a plunger positioned in said cylindrical opening and projecting into said chamber, said plunger being mounted for axial movement between the closed end of said cylindrical opening and one side of said chamber, a second passage having a second opening into said chamber on said one side of said chamber with said second opening being aligned with said plunger so that when said plunger is positioned against said chamber wall said second opening is closed, means for biasing said plunger against said second opening, a metal core which can conduct magnetic flux forms the closed end of the cylindrical opening, an electromagnetic coil is positioned around said cylindrical opening encircling the bottom of the core and mating end of said plunger, said plunger being a permanent magnet, means for placing an impulse of current flow in one direction through the electromagnetic coil to momentarily move the magnetic plunger in one direction against said biasing means to magnetically engage the bottom of the core, said means for placing an impulse of current flow in one direction through the electromagnetic coil including a switch, a D.C. power source and a capacitor means; said switch being movable to place said D.C. power source and capacitor means in series with said electromagnetic coil, said switch also being movable to place said electromagnetic coil and capacitor means in series to discharge said capacitor across said electromagnetic coil placing an impulse of current flow in the opposite direction through the electromagnetic coil, wherein circuit means are connected across said electromagnetic coil which will limit the current flow through said electromagnetic coil to prevent the magnetic flux caused by the impulse from said capacitor means from being excessive thereby reducing any tendency to demagnetize said plunger.

2. A solenoid valve having a housing, said housing having a chamber located therein, a first passage having a first opening in said chamber, said housing having a cylindrical opening extending from said chamber having a closed end, a plunger positioned in said cylindrical opening and projecting into said chamber, said plunger being mounted for axial movement between the closed end of said cylindrical opening and one side of said chamber, a second passage having a second opening into said chamber on said one side of said chamber with said second opening being aligned with said plunger so that when said plunger is positioned against said chamber wall said second opening is closed, means for biasing said plunger against said second opening, a metal core which can conduct magnetic flux forms the closed end of the cylindrical opening, an electromagnetic coil is positioned around said cylindrical opening encircling the bottom of the core and mating end of said plunger, said plunger being a permanent magnet, wherein a resilient cap is fixed to one end of said permanent magnet, said resilient cap being on the end of said plunger engaging said second opening, said resilient cap forming an annular exposed surface around said plunger, said means for biasing said plunger against said second opening being a spring, said spring being positioned around said plunger with one end resting against the annular surface of said resilient cap and the other end engaging the housing around said plunger.

3. A solenoid valve having housing means; said housing means having a flow passage located therein; said flow passage having a first opening; said flow passage having a second opening; a plunger mounted for movement between two end positions in said housing means; one part of said plunger being aligned with said second opening so that when said plunger is positioned against said opening the plunger is at one of its two end positions and the second opening is closed; means for biasing said plunger against said second opening; a metal core positioned in said housing means in alignment with said plunger so that when said plunger is positioned against said metal core said plunger is in its other end position and the second opening is open; an electromagnetic coil is positioned around a portion of said core and mating end of said plunger; a permanent magnetic force for holding said plunger against said metal core; first means for placing a first impulse of current flow in one direction through the electromagnetic coil to momentarily move the magnetic plunger in one direction against said biasing means to magnetically engage the bottom of the core, second means for placing a second impulse of current flow in the opposite direction through the electromagnetic coil to move the plunger in its other direction, the direction in which the plunger is biased by said biasing means, to close said second opening; circuit means being connected across said electromagnetic coil which will limit the current flow through said electromagnetic coil to prevent the magnetic flux caused by the second impulse from being excessive; said circuit means includes a blocking diode for preventing current from said first impulse from passing therethrough, and a Zener diode to dissipate excessive current from said second impulse to prevent the magnetic flux caused by said second impulse from being excessive.

4. A solenoid valve having housing means; said housing means having a flow passage located therein; said flow passage having a first opening; said flow passage having a second opening; a plunger mounted for movement between two end positions in said housing means; one part of said plunger being aligned with said second opening so that when said plunger is positioned against said opening the plunger is at one of its two end positions and the second opening is closed; means for biasing said plunger against said second opening; a metal core positioned in said housing means in alignment with said plunger so that when said plunger is positioned against said metal core said plunger is in its other end position and the second opening is open; an electromagnetic coil is positioned around a portion of said core and mating end of said plunger; a permanent magnetic force for holding said plunger against said metal core; first means for placing a first impulse of current flow in one direction through the electromagnetic coil to momentarily move the magnetic plunger in one direction against said biasing means to magnetically engage the bottom of the core, second means for placing a second impulse of current flow in the opposite direction through the electromagnetic coil to move the plunger in its other direction, the direction in which the plunger is biased by said biasing means, to close said second opening; circuit means being connected across said electromagnetic coil which will limit the current flow through said electromagnetic coil to prevent the magnetic flux caused by the second impulse from being excessive; said first means for placing a first impulse of current flow in one direction through the electromagnetic coil includes a switch, a D.C. power source and a capacitor means; said switch being movable to place said D.C. power source and capacitor means in series with said electromagnetic coil; said second means for placing said second impulse of current flow in the opposite direction through the electromagnetic coil to move the plunger in its other direction, the direction in which the plunger is biased by said biasing means, to close said second opening including said switch and said capacitor means said switch being movable to another position to place said electromagnetic coil and said capacitor means in series to discharge said capacitor means across said electromagnetic coil; said circuit means limiting the current flow from said capacitor means; said circuit means includes a blocking diode for preventing current from said first impulse from passing therethrough, and a Zener diode to dissipate excessive current from the second impulse from said capacitor means to prevent the magnetic flux caused by said second impulse from being excessive.

5. A solenoid valve having housing means; said housing means having a flow passage located therein; said flow passage having a first opening; said flow passage having a second opening; a plunger mounted for movement between two end positions in said housing means; one part of said plunger being aligned with said second opening so that when said plunger is positioned against said opening the plunger is at one of its two end positions and the second opening is closed; means for biasing said plunger againt said second opening; a metal core positioned in said housing means in alignment with said plunger so that when said plunger is positioned against said metal core said plunger is in its other end position and the second opening is open; an electromagnetic coil is positioned around a portion of said core and mating end of said plunger; said plunger being a permanent magnet; means for placing an impulse of current flow in one direction through the electromagnetic coil to momentarily move the magnetic plunger in one direction against said biasing means to magnetically engage the bottom of the core, said means for placing an impulse of current flow in one direction through the electromagnetic coil includes a switch, a D. C. power source and a capacitor means; said switch being movable to place said D. C. power source and capacitor means in series with said electromagnetic coil; said switch also being movable to place said electromagnetic coil and capacitor means in series to discharge said capacitor means across said electromagnetic coil placing an impulse of current flow in the opposite direction through the electromagnetic coil to move the magnetic plunger in its other direction, the direction in which the plunger is biased by said biasing means, to close said second opening; circuit means being connected across said electromagnetic coil which will limit the current flow through said electromagnetic coil to prevent the magnetic flux caused by the impulse from said capacitor means from being excessive.

* * * * *